(12) United States Patent
Polzhofer et al.

(10) Patent No.: US 6,733,123 B2
(45) Date of Patent: May 11, 2004

(54) HYDROGEL CONTACT LENSES OF HIGH BIOCOMPATIBILITY

(75) Inventors: Kurt Polzhofer, Schönkirchen (DE); Roland Fromme, Schönkirchen (DE); Lothar Haase, Schönberg (DE); K Herter, Bordesholm (DE); Birgit Kollosche, Kiel (DE)

(73) Assignee: Wohlk Contact-Linsen GmbH (DE)

( * ) Notice: Subject to any disclaimer, the term of this patent is extended or adjusted under 35 U.S.C. 154(b) by 50 days.

(21) Appl. No.: 10/038,110

(22) Filed: Nov. 9, 2001

(65) Prior Publication Data

US 2002/0180927 A1 Dec. 5, 2002

(30) Foreign Application Priority Data

Nov. 10, 2000 (DE) .......................... 100 55 762

(51) Int. Cl.⁷ ................................. G02C 7/04
(52) U.S. Cl. .................... 351/160 H; 351/177
(58) Field of Search ................ 351/160 R, 160 H, 351/161–162, 177; 526/242, 279, 309, 304, 265; 524/724; 528/328

(56) References Cited

U.S. PATENT DOCUMENTS

| | | |
|---|---|---|
| 4,495,361 A | 1/1985 | Friends et al. .............. 556/419 |
| 4,652,622 A | 3/1987 | Friends et al. .............. 526/279 |
| 4,663,409 A | 5/1987 | Friends et al. .............. 526/242 |
| 4,668,506 A | 5/1987 | Bawa .......................... 424/429 |
| 5,006,622 A | 4/1991 | Kunzler et al. ............. 526/309 |
| 5,236,969 A | 8/1993 | Kunzler et al. ............. 523/108 |
| 5,256,751 A | 10/1993 | Vanderlaan ................. 526/304 |
| 5,270,418 A | 12/1993 | Kunzler et al. ............. 526/309 |
| 5,311,223 A | 5/1994 | Vanderlaan ............. 351/160 H |
| 5,391,669 A | 2/1995 | Sulc et al. ................... 526/265 |
| 5,645,883 A | 7/1997 | Russell et al. ............. 427/2.25 |
| 5,760,100 A | 6/1998 | Nicolson et al. ............ 523/106 |
| 5,858,296 A | 1/1999 | Domb ......................... 264/330 |
| 6,096,138 A | 8/2000 | Heiler et al. .................. 134/42 |
| 6,191,098 B1 * | 2/2001 | Rodrigues et al. .......... 510/475 |
| 6,346,594 B1 * | 2/2002 | Watanabe et al. ............. 528/26 |
| 6,534,590 B1 * | 3/2003 | Aso et al. .................... 524/806 |

* cited by examiner

Primary Examiner—Jordan M. Schwartz
Assistant Examiner—Jessica Stultz
(74) Attorney, Agent, or Firm—Schweitzer Cornman Gross & Bondell LLP

(57) ABSTRACT

A hydrogel contact lens is described, the HEMA basic material of which is copolymerized with SPE and amino acids. The water retention capability and the refractive index of the resulting contact lens are similar to those of the natural cornea.

27 Claims, 3 Drawing Sheets

HYDROGEL CONTACT LENSES OF HIGH BIOCOMPATIBILITY

The invention relates to a hydrogel contact lens of high oxygen permeability, to a polymer material suitable for this purpose and to the use of the latter for producing such lenses.

BACKGROUND OF THE INVENTION

On its inner side, the natural cornea of the eye has a layer of endothelial cells, which are supplied through the cornea with oxygen from the surrounding air. In order to make this possible, the cornea must therefore have a high oxygen permeability. However, permanent exposure of the cornea to the surrounding air would cause the cornea to dry out. In order to avoid this, the cornea, by blinking of the eye, is permanently wetted with a liquid, which is referred to as tears, and contains proteins, lipoproteins, lipids and mucins in solution. Because this liquid is constantly replenished and evaporates on the surface of the eyes, the materials dissolved in the tear liquid would have to be deposited on the cornea, making it cloudy. So that this does not happen, nature has developed a protective mechanism for which, however, there is not yet a complete explanation.

There is therefore a need for a contact lens which has a high oxygen permeability and a good compatibility and which imitates the properties of the cornea.

The water content of the cornea usually is about 65% to 75% by weight. The cornea itself has an exceptionally high water-retention capability. By these means, an excessive decrease in the moisture content of the cornea surface is avoided, even in dry air, such as cold, polar air, and in air-conditioned spaces, such as aircraft, in which water evaporation is particularly strong. This high water-retention capability also prevents the concentration of the tear liquid increasing to such an extent that the materials dissolved in the liquid crystallize out.

In this connection, it is known that sulfo compounds, especially keratan sulfates and chondroitin sulfates, play a role in the water-retention capability of the natural cornea.

It is furthermore known that, in nature, the deposition of the above-mentioned substances on the surface of the cornea is avoided by a betaine structure within the collagen. Moreover, the collagen of the cornea contains glycine, proline, glutamine, alanine, arginine, asparagines, lysine, leucine, serine, isoleucine, etc. as amino acids.

The U.S. Pat. No. 5,311,223 discloses a hydrogel contact lens, the polymer composition of which consists of a reaction product of hydrophilic methacrylamide as well as an acrylic monomer, which in a preferred embodiment contains a zwitterionic monomer, such as a sulfobetaine, for example, N-(3-sulfopropyl)-N-methacryloxyethyl-N,N-dimethylammonium betaine (SPE), in order to improve the water-retention capability. Moreover, U.S. Pat. No. 4,663,409 discloses that the water-retention capability is improved by polymerizing amino acid monomers into the matrix of a hydrogel contact lens. In many cases, however, the water-retention capability is still not yet satisfactory.

The refractive index is a further, important property of hydrogel contact lenses. The natural cornea has a refractive index of 1.37 and the whole lens of the eye has an overall refractive index of 1.42. The refractive index of the contact lens should therefore approximate that of the cornea, without, however, reducing its water-retention capability.

It is therefore an object of the invention to provide a hydrogel contact lens which exhibits exceptionally high oxygen permeability and a water-retention capability and refractive index which approximate that of the natural cornea.

BRIEF DESCRIPTION OF THE INVENTION

Pursuant to the invention, this objective is accomplished by a hydrogel contact lens, the base or basic material of which contains monomers, which are modified with amino acids, and zwitterionic monomers, which are modified with betaine. Moreover, the modified monomers preferably are polymerized randomly distributed in the basic material.

Surprisingly, it was found pursuant to the invention that not only does this copolymer have a particularly pronounced water retention capability, but also that a refractive index can be set with it which comes very close to that of the natural cornea of 1.37.

The water content also corresponds to that of the natural cornea. In the swollen state, the contact lens material contains 55% to 60% water. The water content can be adjusted relatively accurately by an appropriate use of the betaines or amino acids, so that lenses with a higher or somewhat lower water content and, with that, also different swelling capabilities, can be obtained, as desired.

Pursuant to the invention, the amino acids are polymerized directly into the polymer. For this purpose, they are preferably tied into a monomer, which can be linked to the polymer chain. Pursuant to the invention, preferred monomers are those which can be co-polymerized directly with the basic lens material, that is, incorporated directly into the polymer chain. Pursuant to the invention, $\alpha$, $\beta$ unsaturated carbonyl compounds (carbonyl modified), are particularly preferred. In this way, the modified amino acids, used for the copolymerization, are obtained. The betaimes, which are used pursuant to the invention are also co-polymerized in this manner in the polymer matrix.

Preferably, the amino acids are those which occur in the natural collagen of the cornea, such as those named above, or a mixture thereof, glycine being preferred. Basically, all natural or synthetic amino acids, such as $\beta$-alanine, $\gamma$-aminobutyric acid, $\omega$-aminocapronic acid, $\omega$-aminododecanoic acid, $\beta$-cyanalanine, $\epsilon$-methylhistidine, canavanine, djencolic acid, 1-azaserine, $\gamma$-methyleneglutamic acid, N-methyltyrosine, glycine, alanine, serine, cystine, cysteine, lanthoinine, phenylalanine, tyrosine, diiodotyrosine, tryptophane, histidine, aminobutyric acid, methionine, valine, norvaline, leucine, isoleucine, norleucine, arginine, ornithine, lysine, aspartic acid, glutamic acid, threonine, hydroxyglutamic acid, proline, hydroxyproline, asparagine, glutamine, desmosine, isodesmosine and 5-hydroxylysine can be used.

Acrylic acid, crotonic acid, methacrylic acid, maleic acid, fumaric acid, itaconic acid and their functional derivatives, such as acid chlorides, anhydrides, amides and esters are $\alpha,\beta$-unsaturated carbonyl modifiers for the modified amino acids.

Preferably, the amino acid, polymerized into the basic material of the contact lens, is present as methacryloyl amino acid. Preferably, the amino acid monomer and the betaine monomer are co polymerized with a main chain and/or a side chain of the matrix material.

The percentage of amino acid in the polymer, preferred with respect to the water-retention capability and the refractive index, is 0.5% to 25% by weight, preferably 0.5% to 10% by weight and particularly about 3% by weight.

The betaine, polymerized in the matrix, preferably is present as sulfobetaine, especially as N-(3-sulfopropyl)-N- methacrylxoyethyl-N,N-dimethylammonium betaine (SPE) and/or as carboxybetaine, which forms a block-free copolymer in the basic material.

The percentage of betaine in the polymer, preferred with respect to the water retention capability and the refractive index, is 0.5% to 22% by weight, preferably 0.5% to 10% by weight and especially about 3% by weight.

All transparent polymers are suitable as basic material for the inventive contact lens. Appropriate polymers are, for example, acrylates and/or polyvinyl polymers, especially polyvinylpyrrolidone.

Hydroxyethyl methacrylate (HEMA) and/or hydroxypropyl methacrylate (HPMA), as well as vinylpyrrolidone (VP) or a mixture thereof are particularly preferred basic materials for the contact lens. Acrylamide derivatives, preferably dimethyl acrylamide derivatives, can also be used as the basic material.

Preferably, the percentage of base material in the polymer is 53% to 99% by weight, especially 80% to 99% by weight and particularly about 94% by weight.

The refractive index of the contact lens material does not deviate by more than 10% and preferably not by more 4% from 1.37, that of the natural cornea and, in particular, ranges from 1.370 to 1.441, depending on the mixing ratio and on the amino acid monomers and betaine monomers selected. Preferably, these values are attained in the at least partly and especially in the fully swollen state.

The refractive index of the contact lens material is essentially determined by the main monomer or monomers. Moreover, the refractive index of the especially preferred HEMA polymer in the clean state is 1.442. By co-polymerizing amino acids and/or betaine derivatives into the polymer, the refractive index can be adjusted finely to values between 1.370 and 1.441. In this connection, it should be noted that an increase in the concentration of the amino acid or the betaine derivatives in the polymers leads to a decrease in the refractive index. At the same time, the water content of the polymer is increased. As a result, the refractive index approaches more or less that of pure water of 1.333.

In the swollen state, the inventive contact lens contains more than 50% by weight and preferably 55% to 60% of water.

With the above-described inventive contact lens material, oxygen permeabilities especially with a DK values of $>8 \times 10^{-11}$, preferably of $>15 \times 10^{-11}$ and particularly of about $23 \times 10^{-11}$ can be attained.

According to a further aspect of the invention, a method is provided for the preparation of a polymer material, which is suitable for hydrogel contact lenses and characterized by the steps of mixing methacrylate monomers with monomers modified with amino acids and with monomers modified with betaines and polymerizing this material with a starter and a cross linking agent, particularly by free radical polymerization.

Preferred starters are azo compounds and peroxy compounds and/or photochemical reaction starters. Further suitable starters are peroxides, azo compounds, UV radiation, redox systems and similar starters. Examples of free radical starters which are suitable here, are bis-(isopropyl)-peroxydicarbonate, 2,2'-azobis-(isobutyronitrile), acetyl peroxide, benzoin methyl ether, lauroyl peroxide, decanoyl peroxide, benzoyl peroxide, 2,2'-azobis(2,4-dimethylvaleronitrile), t-butyl peroctoate, phthalyl peroxide, cumene hydroperoxide, diethoxyacetophenone and t-butyl peroxypivalate.

Preferably, the cross linking agent is present in an amount of 0.01% to 3% by weight, especially 0.5% to 2% by weight and particularly 0.1% to 5% by weight. The following are suitable cross linking agents: polyfunctional derivatives of different α,β unsaturated acids, such acrylic acid, methacrylic acid, crotonic acid, itaconic acid, maleic acid and fumaric acid, acrylamide, methacrylamide and multivinyl-substituted benzenes. Especially suitable are, for example, ethylene glycol diacrylate or dimethyacrylate, diethylene glycol diacrylate or dimethyacrylate, tetraethylene glycol diacrylate or dimethyacrylate, polyethylene glycol diacrylate or dimethyacrylate, trimethylolpropane triacrylate or trimethacrylate, bisphenol A diacrylate or dimethyacrylate, ethoxylated bisphenol A diacrylate or dimethyacrylate, pentaerythritol triacrylate and tetracrylate or methacrylate, tetramethylene diacrylate or dimethyacrylate, methylene bisacrylamide or bismethcrylamide, dimethylene bisacrylamide or bismethacrylamide, N,N'-dihydroxyethylene bisacrylamide or bismethacrylamide, hexamethylene bisacrylamide or bismethacrylamide, decamethylene bisacrylamide or bismethacrylamide, divinylbenzene, vinyl methacrylate and allyl methacrylate. Furthermore, cross linking agents based on siloxanes, as well as resonance-free cyclic di(alkylene tertiary amine) compounds, such as N,N'-divinyl ethylene urea, or also divinyl or polyvinyl ethers and divalent or polyvalent alcohols, such as ethylene glycol divinyl ether, come into consideration.

The contact lens can be produced individually as a cast lens, with a polymerization time of less than 1 hour and preferably of less than 30 minutes. Preferably, 0.2% to 0.5% by weight of reaction starter is used.

According to a further possibility, the mixture is polymerized first into a block-shaped, preferably rod-shaped material for a prolonged period of about 1 to 3 days under a controlled temperature. The individual lenses are then produced mechanically from this block material, for example, on a lathe. In this case, preferably 0.05% to 0.2% by weight of reaction starter is used.

In a further inventive embodiment, up to 20% by weight of glycerin are added for the polymerization.

BRIEF DESCRIPTION OF THE DRAWINGS

In the following, examples of the invention are explained by means of enclosed drawings, in which.

DETAILED DESCRIPTION OF EMBODIMENTS OF THE INVENTION

Figure 1:
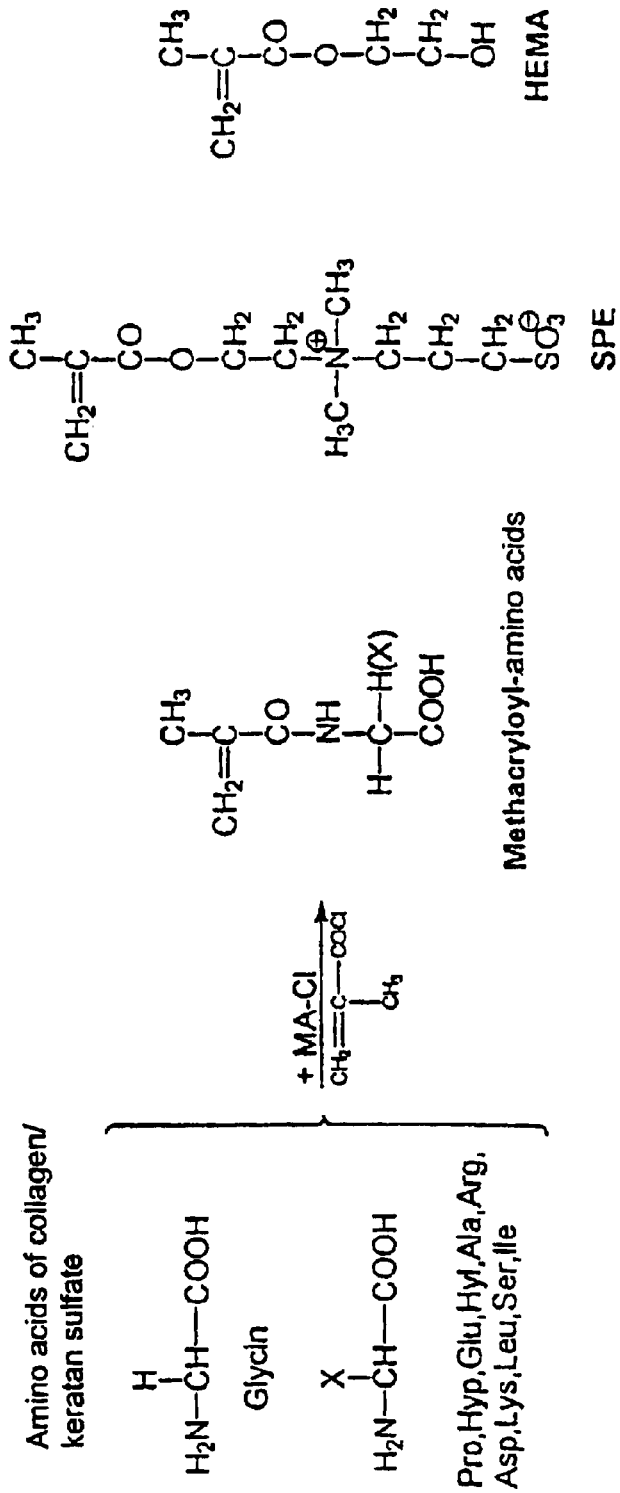
FIG. 1 shows an example of the synthesis of the inventive contact lens.
Figure 1:
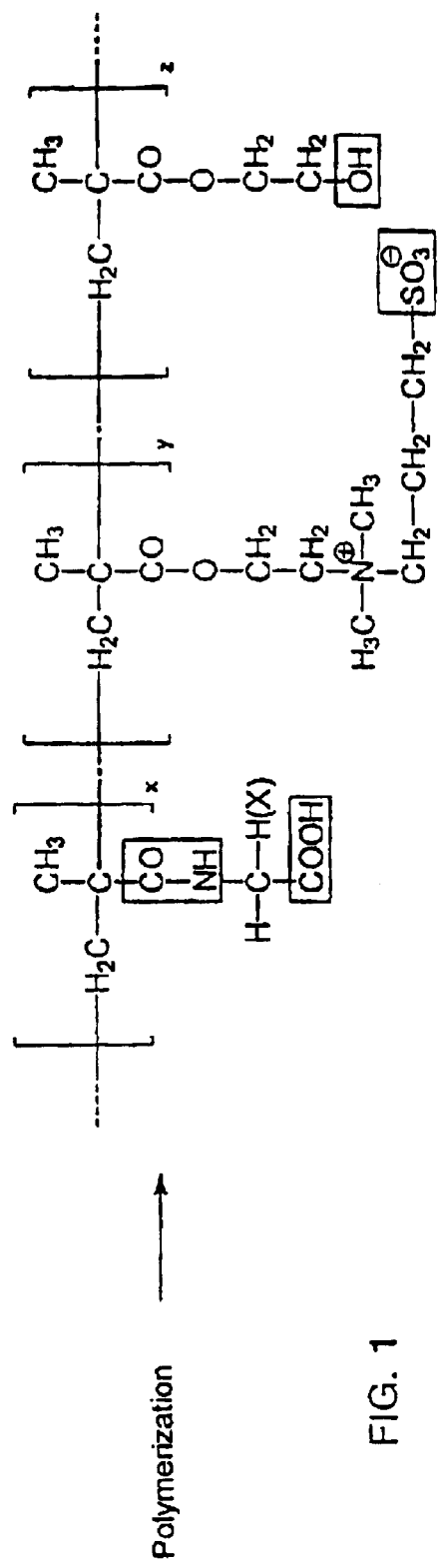

FIG. 1 shows a polymerization of the inventive contact lens material of amino acids, which are contained in collagen. Their modification to methacryloyl amino acids are the starting point. Likewise, the structure of SPE (N-(3-sulfopropyl)-N-methacryloylhydroxyethyl-N,N-dimethylammonium betaine) and HEMA (hydroxymethyl methacrylate) as the basic/base material is also shown. These materials are polymerized together. The proportions of X (methacryloyl amino acids), to Y (SPE) to Z (HEMA) for the polymerization is 0.5 to 10% by weight of X to 0.5 to 10% by weight of Y and 80 to 99% by weight of Z. Depending on the conditions, mixing problems may arise at Y values above 9% by weight; however, these problems can be avoided by means of additives, such as glycerin.

It is also possible to carry out the whole polymerization in the presence of 0 to 20% of glycerin and the remaining polymerization components. In this case, the remaining polymerization components (also referred to as solids in the following) comprise 0.5 to 25% by weight of X, 0.5 to 22% by weight of Y and 99 to 53% by weight of Z. in the normal case, the HEMA itself acts as solvent for the methacryloyl amino acid and for the SPE (Y).

A further possibility for producing the inventive lenses consists of modifying the SPE, in that the sulfate group is replaced by a carboxylic acid group. In principle, other betaines can also come into consideration, which can be attached as basic material to a methacrylate compound, so that they are incorporated into the methacrylic polymer chain. Preferably, a completely random copolymer is to be formed here without any blocks.

Instead of HEMA, HPMA (hydroxypropyl methacrylate) and mixtures of this substance can also be used pursuant to the invention as a polymerization base. Furthermore, it is possible to use vinylpyrrolidone (VP) as basic material. In this case, the amino acids as well as the betaine-like zwitterions must be modified appropriately for the copolymerization. Likewise, acrylamide derivatives, such as dimethylacrylamide, are also suitable.

In general, the monomers, modified with amino acids, are obtained by reacting the amino acids with a monomer, which is reactive at a place which cannot be polymerized. For example, acryloyl chloride derivatives are to be used as preferred monomers for the acrylates.

The invention is described in greater detail in the following by means of a few examples.

EXAMPLE 1 (COMPARISON EXAMPLE)

HEMA (98.5 g), 1.5 g of methacrylic acid as well as 0.37 g of 2,2'-azobis(2,4-dimethylvaleronitrile) are filled into small polypropylene molds and polymerized for 30 minutes at 100° C. The cured contact lenses, so obtained, are swelled in a buffered, physiological salt solution, packed and sterilized. The water content of the contact lens, so obtained, is about 40%.

EXAMPLE 2
Synthesis of N-Methacryloyl Glycine

Glycine (7.5 g, 0.1 moles) is dissolved in 30 ml of aqueous sodium hydroxide solution (8 g, 0.2 moles) and cooled in ice and methacryloyl chloride (10.45 g, 0.1 moles), dissolved in 10 ml of chloroform, is added dropwise with stirring. After that, the reaction is allowed to continue for one hour at room temperature. The solution, cooled in ice, is acidified to a pH of 2 with 5N aqueous hydrochloric acid and exhaustively extracted with ethyl acetate. The organic solution is dried over sodium sulfate and evaporated under vacuum, 10 g (70%) of a crystalline product of N-methyacryloyl glycine with a melting point of 104° C. to 105° C. being obtained.

N-methacryloyl derivatives of alanine, valine, leucine, proline, glutamic acid, aspartic acid and the like can be produced similarly.

EXAMPLE 3

A mixture of 93.28 g of 2-hydroxyethylene methacrylate (HEMA), 3 g of N-methacryloyl glycine (MA-Gly) (Example 2), 3 g of N,N-dimethyl-N-(2-methacryloylethyl)-N-(3-sulfopropyl) ammonium betaine (SPE), 0.35 g of ethylene glycol dimethacrylate (EGDMA), 0.37 g of 2,2'azobis (2,4-dimethylvaleronitrile) and 0.005 g of Macrolex® (obtainable from Bayer AG, Leverkusen) Green G are filled into small propylene molds and polymerized for 30 minutes at 100° C. The cured contact lenses are swelled in buffered physiological salt solution, packed and sterilized. The water content of the completely swollen contact lens then is about 55%.

Similarly to this procedure, additional inventive contact lenses were polymerized and swelled. The results are given in the following Table I. Within the lenses, the water can be absorptively bound in different ways. It is necessary to differentiate between directly bound water and free water. The directly bound water is bound electrostatically to the functional groups by means of ionic interactions. On the other hand, the free water is embedded between the individual groups of molecules. This free water generally is given off more easily once again than is the water bound directly to the functional groups.

Figure 2:
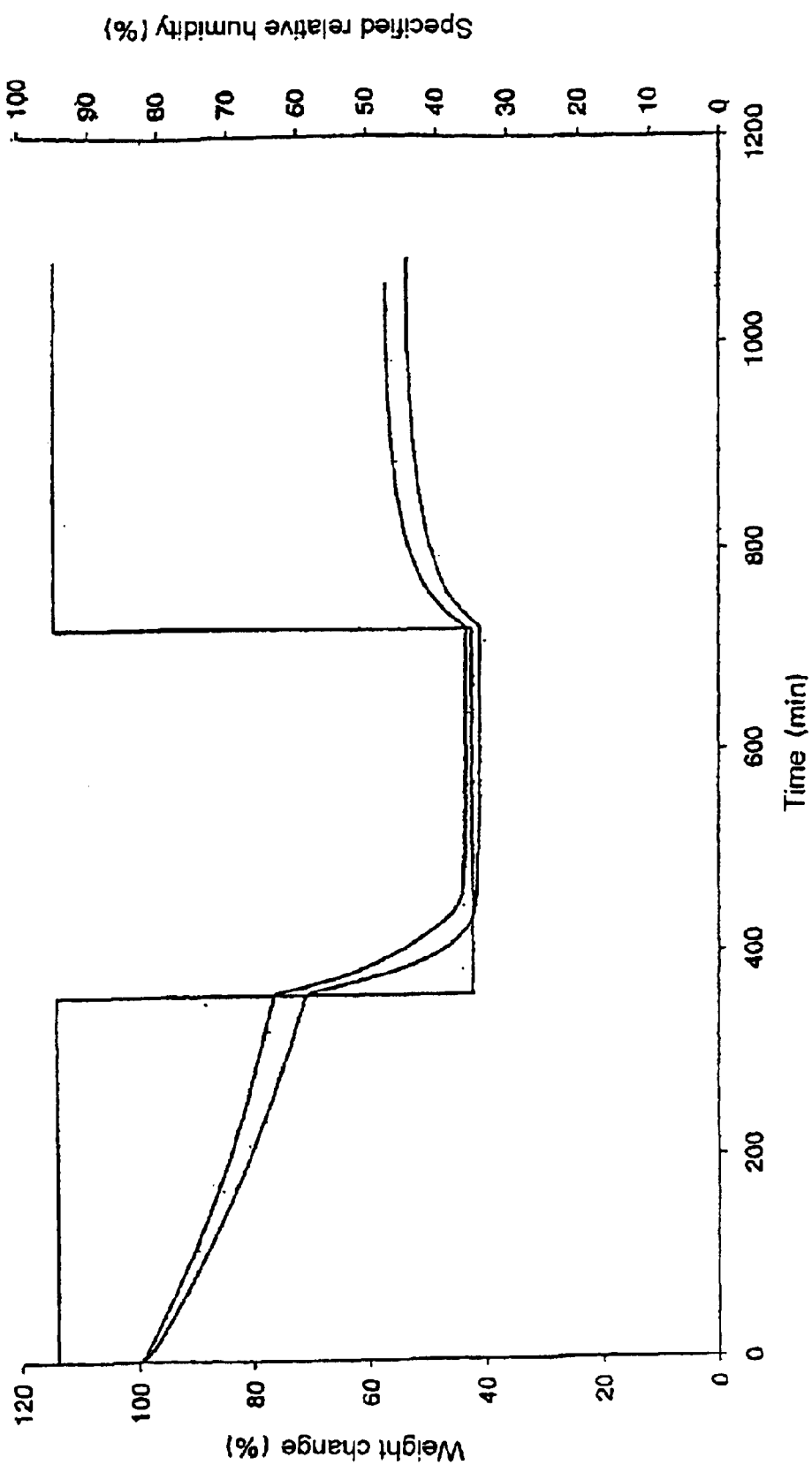
FIG. 2 shows the dehydration and rehydration of inventive and conventional contact lenses.

A curve, relating to this is shown in FIG. 2. For this experiment, inventive (of Example 3, Table I, BK70-91) and conventional contact lenses (of Example 1) were initially hydrated in air, which had been saturated with moisture to the extent of 95%. The relative humidity was then reduced stepwise to 40% and, subsequently, increased once again stepwise to 95%, in order to measure the dehydration and rehydration behavior of inventive and conventional lenses. The left ordinate indicates the moisture content within the lens and the right ordinate the specified air humidity. The investigation was carried out at 35° C., corresponding to the typical temperature of the lens of the eye or of the cornea. The upper curve shows the behavior of the inventive lens material and the lower curve shows the behavior of the conventional lens material. The diagram clearly shows that, in the same time period, the moisture content of the inventive lens material decreases significantly less during dehydration than the moisture content of conventional lens material and that, during rehydration in the same time period, the inventive lens material absorbs clearly more water than does the conventional lens material.

Figure 3:
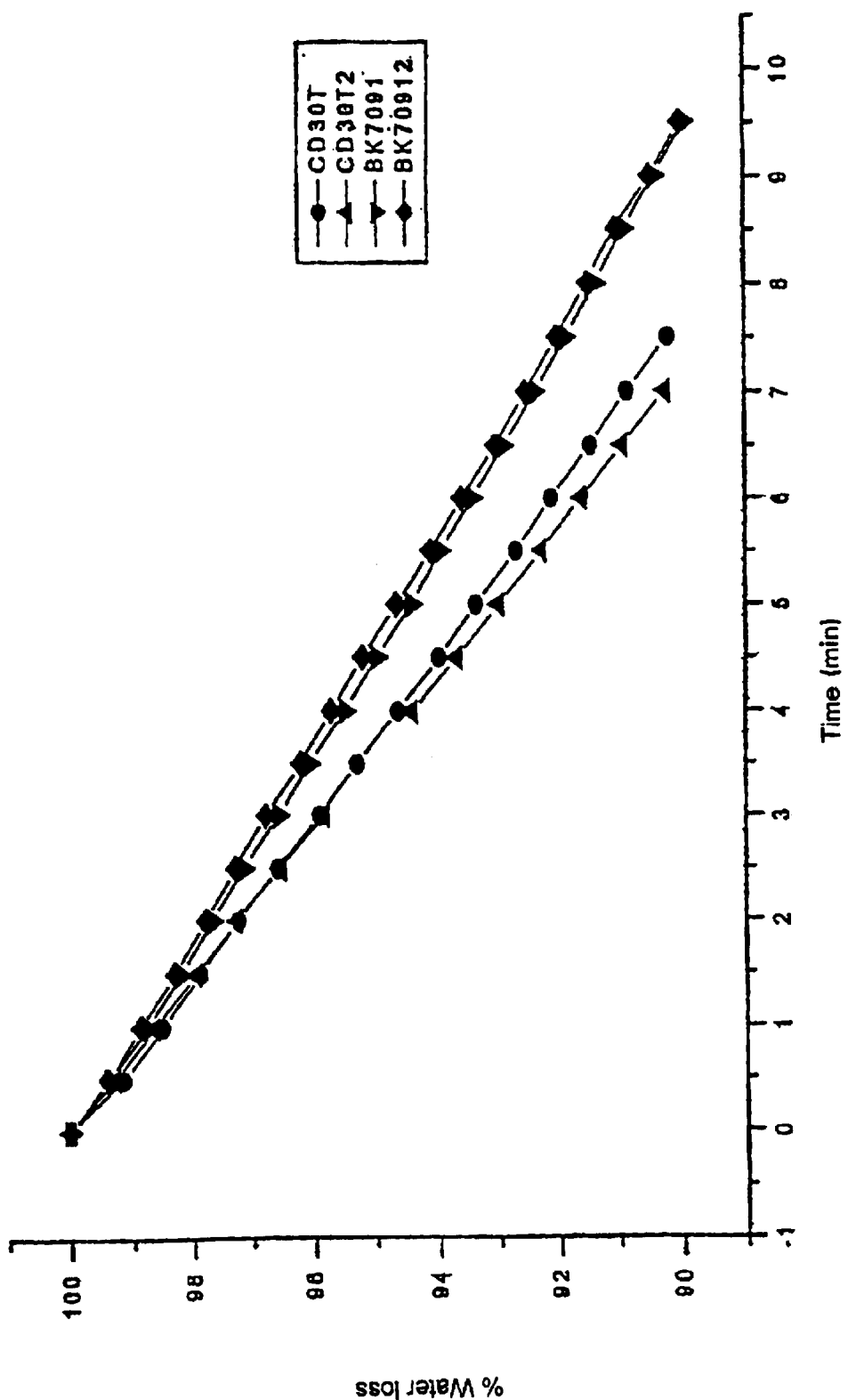
FIG. 3 shows the dehydration profile of inventive and conventional contact lenses.

A further comparison shows the dehydration profile of FIG. 3, in which the percentage water loss is plotted as a function of the time at room temperature and in a dry atmosphere for inventive contact lenses (BK7091 and BK7092) as well as for conventional hydrogel contact lenses (CD30T and CD30T2). Here also, it is clear that the inventive contact lenses dehydrate more slowly than do conventional contact lenses.

The oxygen permeability of the inventive lens material is also better than that of conventional hydrogel contact lens material. The oxygen permeability is given by the so-called Dk value, which is a material constant for the lens material and is the product of the diffusion coefficient and the solubility constant of oxygen in the polymer. This Dk value is therefore independent of the geometry of the contact lens, such as the thickness.

If the Dk value is divided by the thickness of the lens, the actual oxygen permeability or the oxygen transmissibility is obtained. The latter is the actual amount of oxygen which reaches the eye through the contact lens. The Dk value is determined as follows: $Dk=2\times e^{0.041\times WC}\times 10^{-11}$ with the units of cc/secx(ml of oxygen/mlxhPa). Conventional poly-HEMA has an oxygen permeability of $8\times10^{-11}$, while the new inventive materials have an oxygen permeability of about $23\times10^{-11}$.

To prepare the lenses, it is possible, on the one hand, to fill the unpolymerized mixture into a contact lens-shaped mold, for example, of polypropylene, and to let the mixture polymerize in the mold in order to obtain so-called cast lenses. On the other hand, it is possible to produce a large amount of polymerization mixture and to allow this to polymerize as a larger block, for example, as a rod, from which the contact lens then is turned, for example, by means of a lathe. The proportions of cross-linking agents and polymerization initiators as well as the polymerization times vary depending on whether the contact lens is cast as a lens or turned from a polymerized rod.

to unevennesses and to greater shrinkage of the finished product. For the molded lens polymerization, which takes place in much shorter time, a larger amount of reaction starter must be used. In the case of these slight amounts, shrinkage is of no importance. The amount of reaction starters, used to polymerize the molded lens is, for example, 0.2% to 0.5% by weight. The reactive reaction starters, which are given above in the Example, can also be used here. For the rod polymerization, 2,2'-azobisisobutyronitrile (AIBN), for example, can be used.

TABLE I

HEMA/Amino Acid/Betaine Copolymers

| Formulation | BK70-53 | IK124-100 | BK70-60 | IK124-10 | BK69-56 | BK69-75 | BK68-89 | BK70-72 |
|---|---|---|---|---|---|---|---|---|
| Amino acid | 7% SPE | 7% SPE | 9% SPE | 9% SPE | 10% Pro | 10% Glu | 10% Glv | 5% Glv |
| FGL/St. | FGL | St. | FGL | St. | FGL | FGL | FGL | FGL |
| WC (%) | 52% | 47% | 55% | 49% | 46% | 70% | 60–65% | 59% |
| Comment | | | | | | | | |

| Formulation | IK124-7 | BK70-74 | BK70-76 | BK70-79A | BK70-82 | BK70-86 | BK70-80B | BK70-80C | BK70-77 |
|---|---|---|---|---|---|---|---|---|---|
| Amino acid | 7% Glv. | 3% Glv. | 4% Glv. | 2% Glv. | 3% Glv. | 3% Glv. | 4% Glv. | 10% Glv. | 10% Glv. |
| FGL/St. | St. | FGL | FGL | FGL | FGL | FGL | St. | St. | St. |
| WC (%) | 48% | 52% | 56% | 51% | 59% | 56–57% | 56–57% | 69% | 71% |
| Comment | dimensionally stable | | | | | | DK = 18.54 | | DK = 32.90 |

| Formulation | BK70-73 | BK70-79B | BK70-80A | BK70-85B | BK70-83A | BK70-83B | BK70-84A | BK70-84B | BK70-85A |
|---|---|---|---|---|---|---|---|---|---|
| Amino acid | 3% Glv. | 3.5% Ala. | 8% Ala. | 5% Val. | 3% Val. | 2% Val. | 5% Val. | 2% Val. | 2% Val. |
| FGL/St. | FGL | FGL | St. | FGL | FGL | FGL | St. | St. | St. |
| WC (%) | 54% | 56% | 61% | 54% | 47% | 47% | | 47–49% | 50% |
| Comment | | | DK = 25.47 | | | | | | |

| Formulation | BK70-89 | BK70-91 | BK70-96 | BK70-95 | BK70-98 | BK70-99 | BK71-2 | IK124-33 |
|---|---|---|---|---|---|---|---|---|
| Amino acid | 3% Val. | 3% Glv. | 3% Glv. | 4% Glv. | Glv. Ala. | 3% Glv. | 3% Glv. | 4% Glv. |
| FGL/St. | FGL | FGL | FGL | St. | FGL | FGL | FGL-Prod. | St. |
| WC (%) | 55% | 56.50% | 54–55% | 56% | 69–70% | 55% | 54–55% | 56.50% |
| Comment | | | 0.35 EGA | 0.35 RGA | | 0.35 EGA + Color | 0.35 EGA + Color | 0.15 EGA |

WC (Water content); FGL (Cast lens); St (rod); EGA (ethyleneglycoldimethacrylate)

To prepare rod material, the polymerization is carried out over 1 to 2 or 3 days at a controlled temperature and the product subsequently is tempered before the individual lenses are produced from it. On the other hand, mold polymerization into cast lenses, for which only tiny amounts, such as a few microliters, are processed, is carried out within a few minutes, usually within 30 minutes.

In both cases, that is for the cast lenses and for the polymerization as a rod, the polymerization preferably is carried out as a free radical polymerization by initiating with a free-radical starter, such as azo compounds and peroxy compounds, as well as with photochemical reaction starters. For the rod polymerization as well as for the molded lens polymerization, between about 0.01% and 3% by weight of cross-linking agent and preferably 0.5% to 2% and especially 0.1% to 0.5% by weight of cross-linking agent are used. Due to the high degree of cross linking, the water content and the water retention capability are reduced. However, this can be compensated for by an increased addition of amino acids.

In the case of the rod polymerization, only a slight amount of reaction starters, namely 0.05% to 0.2% by weight of reaction starters are used, since a higher concentration leads

We claim:

1. A hydrogel contact lens having a base material comprising copolymerized monomers modified with at least one amino acid, and copolymerized monomers modified with betaine, wherein the monomer modified with at least one amino acid is copolymerized with a main chain of the base material a side chain of the base or both.

2. The hydrogel contact lens of claim 1, wherein the at least one amino acid is an amino acid occurring in the natural collagen of the cornea.

3. The hydrogel contact lens of claim 1, wherein the at least one amino acid is chosen from the group consisting of glycine, proline, glutamine, alanine, arginine, asparagine, lysine, leucine, serine, and isoleucine.

4. The hydrogel contact lens of claim 1, 2 or 3, wherein the monomer modified with at least one amino acid is a methacryloyl amino acid.

5. The hydrogel contact lens of claim 1, 2, or 3 wherein the percentage of amino acid in the modified polymer is 0.5% to 25% by weight.

6. The hydrogel contact lens of claim 1, 2, or 3, wherein the base material of the contact lens includes at least one of hydroxyethyl methacrylate (HEMA), hydroxypropyl methacrylate (HPMA), vinylpyrrolidone (VP), and an acrylamide derivative.

7. The hydrogel contact lens of claim 6 wherein the base material of the contact lens includes dimethylacrylamide.

8. The contact lens of claim 6, wherein the base td hydrogel material constitutes 53% to 99% by weight of polymer.

9. The hydrogel contact lens of claim 1, 2, or 3, wherein the refractive index of the contact lens is 1.22 to 1.51.

10. The hydrogel contact lens of claim 1, 2, or 3 wherein the contact lens, in a swollen state, contains more than 50% by weight of water.

11. The hydrogel contact lens of claim 10 wherein the contact lens in the swollen state contains 55% to 60% of water.

12. The hydrogel contact lens of claim 1, 2, or 3, wherein the lens has an oxygen permeability Dk value of $>8\times10^{-11}$.

13. A method for the preparation of a polymer material for a hydrogel contact lens comprising the steps of:

mixing at least one methacrylate monomer, at least one monomer based on an amino acid, and at least one monomer based on betaine; and polymerizing the mixed monomers with a starter and a cross-linking agent, wherein the mixture of material initially is polymerized into a block-shape for approximately 1 to 3 days at a controlled temperature and the individual contact lenses are then machined out of the block material.

14. The method of claim 13, wherein the starter is a free radical starter.

15. The method of claim 14, wherein the starter is chosen from the group consisting of azo and peroxy compounds and photochemical reaction starters.

16. The method of claim 13 or 14, wherein the cross-linking agent is added in an amount of 0.01% to 3% by weight.

17. The method of claim 13 or 14, wherein the contact lens is polymerized individually as a cast lens with a polymerization time of less than one hour.

18. The method of claim 17, wherein the reaction starter is added in an amount of 0.2% to 0.5% by weight.

19. The method of claim 13 or 14 wherein the reaction starter is added in an amount of 0.05% to 0.2% by weight.

20. A hydrogel contact lens having a base material comprising copolymerized monomers modified with at least one amino acid, and copolymerized monomers modified with a betaine, wherein the betaine is at least one of a sulfobetaine and a carboxybetaine chosen to form a block-free copolymer with the base material.

21. The hydrogel contact lens of claim 20, wherein the at least one amino acid is an amino acid occurring in the natural collagen of the cornea.

22. The hydrogel contact lens of claim 20, wherein the at least one amino acid is chosen from the group consisting of glycine, proline, glutamine, alanine, arginine, asparagine, lysine, leucine, serine, and isoleucine.

23. The hydrogel contact lens of claim 20, 21 or 22 wherein the betaine is N-(3-sulfopropyl)-N-methacrylhydroxyethyl-N, N-dimethyl-ammonium betaine (SPE).

24. The hydrogel contact lens of claim 20 21 or 22, wherein the percentage of betaine in the modified polymer is 0.5% to 22% by weight.

25. A method for the preparation of a polymer material for a hydrogel contact lens comprising the steps of:

mixing at least one methacrylate monomer, at least one monomer based on an amino acid, and at least one monomer based on betaine; and polymerizing the mixed monomers with a starter and a cross-linking agent, wherein up to 20% glycerin is added for the polymerization step.

26. The method of claim 25, wherein the starter is a free radical starter.

27. The method of claim 25 or 26 wherein the percentage of monomers based on amino acids is 0.5% to 25% by weight, the percentage of monomers based on betaine is 0.5% to 22% by weight and the percentage of methacrylate monomers is 99% to 53% by weight.

* * * * *